United States Patent
Pastor et al.

(10) Patent No.: US 10,351,004 B1
(45) Date of Patent: Jul. 16, 2019

(54) PRE-CHARGING DC LINK CAPACITOR OF ON-BOARD CHARGER (OBC) USING TRACTION BATTERY

(71) Applicant: Lear Corporation, Southfield, MI (US)

(72) Inventors: Adria Marcos Pastor, Valls (ES); Oscar Lucia Gil, Saragossa (ES); Hector Sarnago Andia, Olvega (ES); Alejandro Naval Pallares, Barbastro (ES)

(73) Assignee: Lear Corporation, Southfield, MI (US)

( * ) Notice: Subject to any disclaimer, the term of this patent is extended or adjusted under 35 U.S.C. 154(b) by 60 days.

(21) Appl. No.: 15/860,736

(22) Filed: Jan. 3, 2018

(51) Int. Cl.
| | |
|---|---|
| *H02J 7/00* | (2006.01) |
| *B60L 11/18* | (2006.01) |
| *H02M 1/42* | (2007.01) |
| *H02M 3/158* | (2006.01) |
| *H02J 7/04* | (2006.01) |

(52) U.S. Cl.
CPC ......... *B60L 11/1811* (2013.01); *H02J 7/0029* (2013.01); *H02J 7/04* (2013.01); *H02M 1/4208* (2013.01); *H02M 3/158* (2013.01); *B60L 2210/10* (2013.01); *B60L 2210/30* (2013.01)

(58) Field of Classification Search
CPC ....... B60L 11/1811; H02J 7/0029; H02J 7/04; H02M 1/4208; H02M 3/158
USPC .............................................. 320/109; 701/22
See application file for complete search history.

(56) References Cited

U.S. PATENT DOCUMENTS

| | | | |
|---|---|---|---|
| 5,581,171 A | 12/1996 | Kerfoot et al. | |
| 7,400,116 B2 | 7/2008 | Kato et al. | |
| 7,830,036 B2 | 11/2010 | Wei et al. | |
| 8,154,895 B2 | 4/2012 | Gilmore | |
| 8,612,073 B2 | 12/2013 | Fuji et al. | |
| 2006/0186861 A1 | 8/2006 | Takahashi et al. | |
| 2009/0244944 A1* | 10/2009 | Jang .................. | H02J 7/345 363/126 |
| 2012/0229100 A1 | 9/2012 | Trenchs et al. | |
| 2012/0280655 A1* | 11/2012 | Schneider ............... | B60L 53/53 320/109 |
| 2013/0121051 A1 | 5/2013 | Weiss et al. | |
| 2014/0244082 A1* | 8/2014 | Caron ..................... | B60K 6/46 701/22 |
| 2015/0131343 A1 | 5/2015 | Hufnagel et al. | |
| 2018/0219473 A1* | 8/2018 | Ogino ..................... | G05F 1/575 |

* cited by examiner

*Primary Examiner* — Zixuan Zhou
(74) *Attorney, Agent, or Firm* — Brooks Kushman P.C.

(57) ABSTRACT

An on-board charger (OBC) for charging a traction battery of an electric vehicle includes a Power Factor Correction (PFC) stage to convert AC power from a mains supply into DC power for use in charging the traction battery, a bi-directional DC/DC converter coupled to the traction battery, a DC link capacitor between the PFC stage and the DC/DC converter, and a controller. The controller is operable to control the PFC stage and the DC/DC converter to operate in (i) a pre-charge mode in which the DC link capacitor is pre-charged using electrical power from the traction battery and (ii) a stable operation mode in which the traction battery is charged using the AC power from the mains supply.

12 Claims, 3 Drawing Sheets

PRE-CHARGING DC LINK CAPACITOR OF ON-BOARD CHARGER (OBC) USING TRACTION BATTERY

TECHNICAL FIELD

The present invention relates to pre-charging the DC link capacitor of an on-board charger (OBC) of an electric vehicle.

BACKGROUND

An on-board charger (OBC) of an electric vehicle is used for charging a traction battery of the vehicle. The OBC charges the traction battery using AC electrical power from a mains supply. The OBC has an input which is connected to the mains supply by an external Electric Vehicle Supply Equipment (EVSE) to receive AC electrical power from the mains supply. The OBC converts AC electrical power received from the mains supply into DC electrical power. The OBC has an output which connects to the traction battery. The OBC provides DC electrical power, converted from the AC electrical power, to the traction battery for charging the traction battery.

Most OBCs have two cascaded stages with a DC link capacitor connected between the stages. The first stage is generally known as a Power Factor Correction (PFC) stage and the second stage is generally known as a DC/DC stage. The PFC stage drains AC electrical power from the mains supply and is responsible for keeping a power factor (PF) close to unity. The PFC stage converts AC electrical power from the mains supply into DC electrical power and delivers this DC electrical power to the DC link capacitor and to the DC/DC stage. The DC/DC stage is responsible for delivering DC electrical power to the output of the OBC through a DC/DC converter. The traction battery is connected to the output of the OBC. In steady-state operation (e.g., a stable operation mode) of the OBC, the voltage of the DC link capacitor is boosted and regulated at a certain DC voltage level; and the traction battery is charged with DC electrical power from the DC link capacitor via the DC/DC converter.

Before charging the traction battery, the DC link capacitor is to be pre-charged to avoid a surge electrical current from the mains supply when the OBC has just been connected to the mains supply. Such surge electrical currents could damage internal components of the OBC and/or could be transferred back to the mains supply and damage the mains supply. Typically, in a pre-charge operation mode of the OBC, the DC link capacitor is charged from a low voltage to a peak voltage of the mains supply. Once the DC link capacitor is charged to a sufficient level (e.g., the peak voltage of the mains supply), the PFC stage of the OBC starts regulating the DC link capacitor voltage to the desired voltage to move the OBC into the stable operation mode.

SUMMARY

An object is pre-charging the DC link capacitor of an on-board charger (OBC) of an electric vehicle using a traction battery of the electric vehicle.

A further object is an OBC configured to operate in (i) a pre-charge mode in which electrical power from the traction battery is used to pre-charge the DC link capacitor and (ii) a stable operation mode in which electrical power from a mains supply is used to charge the traction battery.

An OBC for charging a traction battery of an electric vehicle is provided. The OBC includes a Power Factor Correction (PFC) stage to convert AC power from a mains supply into DC power for use in charging the traction battery, a bi-directional DC/DC switched converter ("DC/DC converter") coupled to the traction battery, a DC link capacitor between the PFC stage and the DC/DC converter, and a controller. The controller is operable to control the DC/DC converter to charge the DC link capacitor using electrical power from the traction battery. While the DC link capacitor is being charged with electrical power from the traction battery, the PFC stage is not intended to operate.

The OBC has an input which may be connected to the mains supply by an EVSE. The controller may be further operable to communicate with the EVSE to have the EVSE not connect the input of the OBC to the mains supply until the DC link capacitor has been charged to a desired threshold voltage value.

The controller may be further operable to disable the PFC stage while the DC link capacitor is being charged using electrical energy from the traction battery.

The PFC stage may be connectable to the mains supply by an Electric Vehicle Supply Equipment (EVSE). The controller may be further operable to request the EVSE to not connect the PFC stage to the mains supply while the DC link capacitor is being charged using electrical energy from the traction battery.

The controller may be further operable to control the PFC stage and the DC/DC converter to charge the traction battery using the AC power from the mains supply.

The controller may be further operable to control the PFC stage to regulate a voltage of the DC link capacitor using the AC power from the mains supply. The controller may be further operable to control the PFC stage to correct a power factor of the AC power from the mains supply.

The PFC stage may include a rectifier to convert the AC power from the mains supply into the DC power in which the rectifier includes an arrangement of diodes devoid of thyristors. The PFC stage may be bi-directional.

The DC/DC converter may be a dual half-bridge resonant DC/DC converter.

Another OBC for charging a traction battery of an electric vehicle is provided. This OBC includes a Power Factor Correction (PFC) stage to convert AC power from a mains supply into DC power for use in charging the traction battery, a bi-directional DC/DC converter coupled to the traction battery, a DC link capacitor between the PFC stage and the DC/DC converter, and a controller. The controller is operable to control the PFC stage and the DC/DC converter to operate in (i) a pre-charge mode in which the DC link capacitor is pre-charged using electrical power from the traction battery and (ii) a stable operation mode in which the traction battery is charged using the AC power from the mains supply.

The controller may be further operable to control the PFC stage and the DC/DC converter to operate in (i) the pre-charge mode while a value of a voltage of the DC link capacitor is less than a threshold voltage value and (ii) in the stable operation mode while the value of the voltage of the DC link capacitor is greater than the threshold voltage value.

A method for operating an OBC configured to charge a traction battery of an electric vehicle is provided. The OBC has a Power Factor Correction (PFC) stage to convert AC power from a mains supply into DC power for use in charging the traction battery, a bi-directional DC/DC converter coupled to the traction battery, and a DC link capacitor between the PFC stage and the DC/DC converter. The method includes controlling the PFC stage and the DC/DC converter to operate in a pre-charge mode in which the DC link capacitor is pre-charged using electrical power from the traction battery. The method further includes controlling the PFC stage and the DC/DC converter to operate in a stable operation mode in which the traction battery is charged using the AC power from the mains supply.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
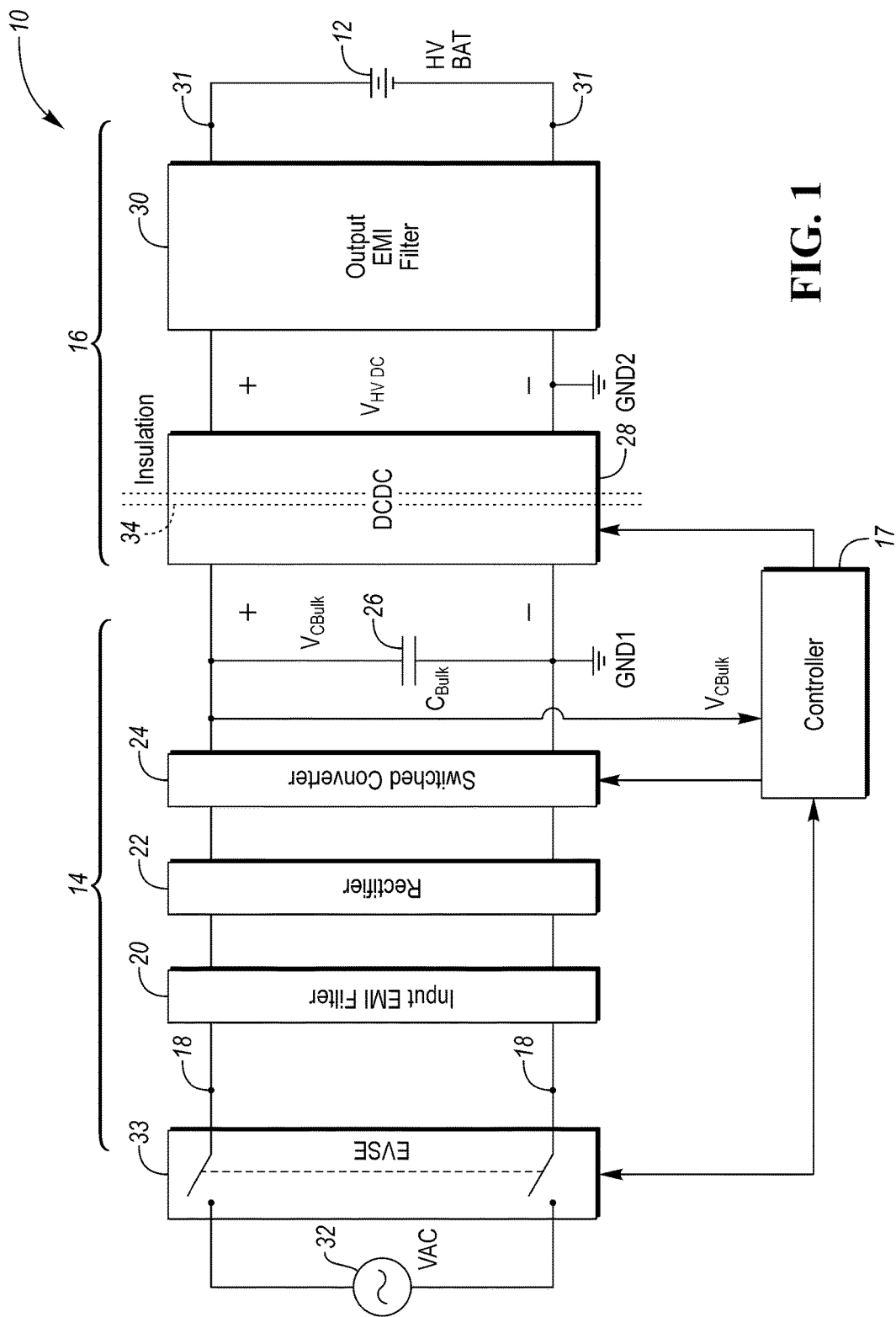
FIG. 1 illustrates a block diagram of an on-board charger (OBC)

Referring now to FIG. 1, a block diagram of an on-board charger (OBC) 10 is shown. OBC 10 is on-board an electric vehicle. The term "electric vehicle" herein encompasses any type of vehicle which uses electrical power for vehicle propulsion and encompasses battery-only electric vehicles (BEV), hybrid electric vehicles (HEV), plug-in hybrid electric vehicles (PHEV), and the like. OBC 10 is used for charging a traction battery 12 of the electric vehicle. Traction battery 12 is a high voltage (HV) DC traction battery per electrical energy requirements for electric vehicle propulsion.

OBC 10 includes a Power Factor Correction (PFC) stage 14, a DC/DC stage 16, and a controller 17. PFC stage 14 includes an input connector 18, an input filter 20, a rectifier 22, a switched converter 24, and a DC link capacitor 26. DC link capacitor 26 is one or more bulk capacitors which collectively comprise the DC link capacitor. DC link capacitor 26 follows switched converter 24 which follows rectifier 22 which follows input filter 20 which follows input connector 18. Input connector 18 is thus at the input side of PFC stage 14 and DC link capacitor 26 is thus at the output side of the PFC stage.

DC/DC stage 16 includes a DC/DC switched converter ("DC/DC converter") 28, an output filter 30, and an output connector 31. Output connector 31 is to receive the wire-harness from a high-voltage (HV) network of which traction battery 12 belongs and is to deliver or receive electrical power between OBC 10 and the traction battery. Traction battery 12 is connected to output filter 30 via output connector 31 to be connected to OBC 10. Output filter 30 follows DC/DC converter 28 which follows DC link capacitor 26. DC link capacitor 26 is thus between PFC stage 14 and DC/DC stage 16. DC link capacitor 26 decouples the electrical power that comes from the AC-side at twice the line frequency. DC link capacitor 26 is commonly named bulk capacitor or DC link capacitor due to its high capacitance and provides a regulated DC voltage node between PFC stage 14 and DC/DC stage 16.

DC/DC converter 28 is a bi-directional DC/DC switched converter. DC/DC converter 28 includes an insulation component 34 (e.g., a transformer) which partitions the DC/DC converter into two portions. A first portion of DC/DC converter 28 is connected to DC link capacitor 26. The remaining second portion of DC/DC converter 28 is connected to output filter 30. DC/DC converter 28 provides the required insulation and gain adaptation between a HV-AC side of OBC 10 and a HV-DC side of the OBC.

Controller 17 is an electronic device such as a processor, a micro-controller, or the like (e.g., a computer). Controller 17 is configured to control switched converter 24 of PFC stage 14 and to control DC/DC converter 28 of DC/DC stage 16. For instance, controller 17 is configured to control power transistor switches of switched converter 24 and of DC/DC converter 28 to control operations of the switched converter and of the DC/DC converter. More generally, controller 17 is configured to control PFC stage 14 and DC/DC stage 16 to control the operations of the PFC stage and of the DC/DC stage. Controller is also operable to communicate with other nodes (not shown) of the electric vehicle including nodes involved in charging applications.

Input connector 18 is connectable to mains supply 32 by an external Electric Vehicle Supply Equipment (EVSE) 33. Input connector 18 connects to mains supply 32 via EVSE 33 for OBC 10 to be connected to the mains supply through the EVSE. EVSE 33 includes internal relays which are movable between a closed position and an opened position. EVSE 33 connects OBC 10 and mains supply 12 when the relays of the EVSE are in the closed position with input connector 18 being connected to the EVSE. EVSE 33 does not connect OBC 10 and mains supply 12 when the relays of the EVSE are in the opened position with input connector 18 being connected to the EVSE. Controller 17 is operable for requesting the relays of EVSE 33 to switch between the closed position and the opened position.

OBC 10 connects to mains supply 32 to receive AC electrical power from the mains supply. Input filter 20 receives an AC mains voltage from mains supply 32 when OBC 10 is connected to the mains supply. Input filter 20 filters the AC mains voltage to reject high-frequency noise therefrom. Input filter 20 outputs the filtered AC mains voltage as an input AC voltage to rectifier 22.

Mains supply 32 may be a single, dual, or three-phase mains supply. As such, AC mains voltage may be a single, dual, or three-phase AC mains voltage. In single or dual-phase, OBC 10 has two inputs terminals. In three-phase, OBC 10 has four input terminals. Depending on the internal structure of OBC 10, PFC stage 14 may have internal relays to match mains supply 32. These relays are not meant to be used in pre-charging DC-link capacitor 26.

Rectifier 22 includes an arrangement of diodes configured to rectify the input AC voltage into a DC voltage. The arrangement of diodes may be, for example, a full-bridge (i.e., diamond) or a half-bridge diode arrangement. In an embodiment, rectifier 22 is specifically devoid of any thyristors or similar components needed to pre-charge DC link capacitor 26 from mains supply 32. In a case of OBC 10 being a bi-directional charger, PFC stage 14 would also be bi-directional. In this case, rectifier 22 includes an arrangement of active components such as MOSFETs.

Switched converter 24 receives the DC voltage from rectifier 22. Switched converter 24 acts on the DC voltage from rectifier 22 to guarantee a proper power factor correction from AC power to DC power. Switched converter 24 includes power switched devices and the like which are used in the AC/DC conversion.

OBC 10 has two operation modes: a stable operation mode and a pre-charge operation mode. In the stable operation mode, DC link capacitor 26 is kept charged at a boosted DC capacitor voltage. Particularly, switched converter 24 charges DC link capacitor 26 with the DC voltage from rectifier 22. DC link capacitor 26 is thus kept charged using the DC voltage from rectifier 22 during the stable operation mode.

Further during the stable operation mode, the boosted capacitor voltage of DC link capacitor 26 is inputted to the first portion of DC/DC converter 28. DC/DC converter 28 converts (i.e., steps-up, or steps-down) the inputted boosted capacitor voltage into an output HV DC voltage. The second portion of DC/DC converter 28 provides the HV DC voltage to output filter 30. Output filter 30 filters the HV DC voltage from DC/DC converter 28 to remove noise therefrom. Output filter 30 provides the filtered HD DC voltage from DC/DC converter 28 to traction battery 12.

Traction battery 12 is thus charged using the HV DC voltage from DC/DC converter 28 during the stable operation mode. As described, DC/DC converter 28 generates the HV DC voltage from the boosted capacitor voltage of DC link capacitor 26 and the DC link capacitor is kept charged at the boosted capacitor voltage using electrical energy from mains supply 32.

In the pre-charge operation mode, DC link capacitor 26 is to be charged up to the boosted DC capacitor voltage. At the beginning of the pre-charge operation mode, the DC capacitor voltage of DC link capacitor 26 is zero volts or a low voltage (i.e., the DC link capacitor is discharged or nearly discharged). Typically, at the beginning of the pre-charge operation, OBC 10 has just been connected via input connector 18 and EVSE 33 to mains supply 32. DC link capacitor 26 is thus to be pre-charged from the zero or low DC capacitor voltage up to the minimum voltage that allows the proper operation of PFC stage 14, i.e., the peak voltage of the input AC voltage. After the pre-charge of DC link capacitor 26, switched converter 24 boosts the voltage of DC link capacitor 26 up to the desired boosted voltage and keeps it at that level during the stable operation mode.

A feature of OBC 10 is that DC link capacitor 26 is pre-charged using DC electrical power from traction battery 12. That is, DC link capacitor 26 is pre-charged with DC electrical power from traction battery 12 as opposed to being pre-charged with AC electrical energy from mains supply 32.

During the pre-charge operation mode, OBC 10 receives DC electrical power from traction battery 12. Particularly, output filter 30 receives a HV DC voltage from traction battery 12. Output filter 30 filters the HV DC voltage from traction battery 12 to reject noise therefrom. Output filter 30 outputs the filtered HV DC voltage from traction battery 12 to the second portion of DC/DC converter 28. DC/DC converter 28 converts (i.e., steps-down) the HV DC voltage from traction battery 12 into a DC voltage. The first portion of DC/DC converter 28 provides the DC voltage to DC link capacitor 26 to charge the DC link capacitor with the DC voltage. As described, the DC voltage is derived from the HV DC voltage provided by traction battery 12. Thus, DC link capacitor 26 is pre-charged using electrical power of traction battery 12.

DC/DC converter 28 charges DC link capacitor 26 with the DC voltage derived from electrical power of traction battery 12 until the capacitor voltage of the DC link capacitor reaches the boosted DC capacitor voltage during the stable operation mode. To detect a fault condition, controller 17 may monitor the capacitor voltage of DC link capacitor 26 to determine whether the capacitor voltage reaches the boosted DC capacitor voltage within a pre-set amount of time or may detect for any over current. In the case of detecting a fault condition, controller 17 may take remedial action such as controlling DC/DC converter 28 to stop charging DC link capacitor 26 until the fault condition can be cleared. Upon the DC link capacitor voltage reaching the boosted DC capacitor voltage, the operation of OBC 10 changes from the pre-charge operation mode to the stable operation mode.

Controller 17 is configured to initiate the pre-charge operation mode as described as follows. Controller 17 is operable to communicate with EVSE 33 to not allow the connection of OBC 10 to mains supply 32 while DC link capacitor 26 is not pre-charged. Controller 17 is operable to detect the value of the capacitor voltage of DC link capacitor 26, as indicated by the $v_{CBulk}$ controller input shown in FIG. 1. Controller 17 can compare the value of the capacitor voltage of DC link capacitor 26 to the value of the boosted DC capacitor voltage.

In embodiments, when the value of the capacitor voltage is less than the value of the boosted DC capacitor voltage, controller 17 controls DC/DC stage 16 to operate in the pre-charge operation mode. Particularly, controller 17 controls DC/DC converter 28 to operate in the pre-charge operation mode and keeps switched converter 24 inactive while the pre-charge operation of DC link capacitor 26 is carried out. In other embodiments, controller 17 controls DC/DC converter 28 to operate in the pre-charge operation mode while keeping switched converter 24 inactive whenever the value of the capacitor voltage is less than the value of the boosted DC capacitor voltage.

Figure 2:
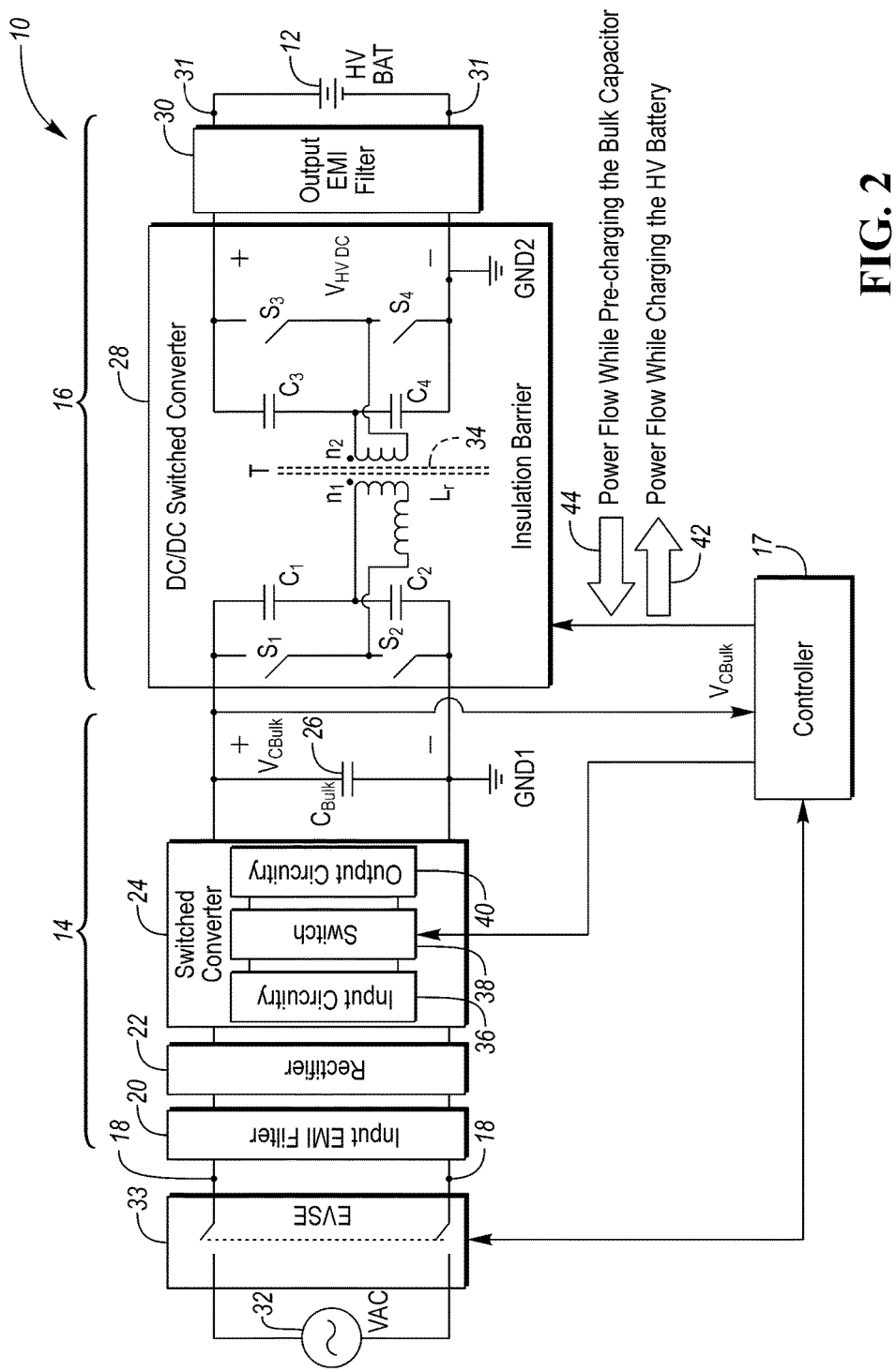
FIG. 2 illustrates a more detailed block diagram of the OBC.

Referring now to FIG. 2, with continual reference to FIG. 1, a more detailed block diagram of OBC 10 is shown. As shown in FIG. 2, switched converter 24 includes input circuitry 36, a power switch assembly 38, and output circuitry 40. Input circuitry 36, power switch assembly 38, and output circuitry 40 function together to act on the DC voltage from rectifier 22 to guarantee a proper PFC operation.

As further shown in FIG. 2, DC/DC converter 28 may be a dual half-bridge resonant DC/DC converter. To this end, DC/DC converter 28 includes an arrangement of a plurality of bi-directional switches S1, S2, S3, and S4, a plurality of capacitors C1, C2, C3, and C4, a resonant inductor Lr, and a power transformer T. The power transformer T includes n1 number of turns in the primary side and n2 number of turns in the secondary side.

During the stable operation mode, controller 17 controls switch assembly 38 of switched converter 24 to enable switched converter 24 to output the DC voltage from rectifier 22 to DC link capacitor 26. As such, DC link capacitor 26 is kept charged at the boosted DC capacitor voltage using electrical energy from mains supply 32. Further, controller 17 controls DC/DC converter 28 to cause the DC/DC converter to step-up or step-down the inputted boosted capacitor voltage from DC link capacitor 26 to the HV DC voltage for charging traction battery 12. The electrical power flow through OBC 10 from mains supply 32 to traction battery 12 during the stable operation mode is indicated by arrow 42 in FIG. 2.

During the pre-charge operation mode, controller 17 controls EVSE 33 to keep OBC 10 disconnected from mains supply 32 and keeps switched converter 24 disabled to avoid a surge electrical current from the mains supply. In this way, DC link capacitor 26 is not pre-charged with AC electrical energy from mains supply 32. Further during the pre-charge operation mode, controller 17 controls the bi-directional switches S1, S2, S3, and S4 of DC/DC converter 28 to have the DC/DC converter function to convert a HV DC voltage from traction battery 12 into a DC voltage for charging DC link capacitor 26. The electrical power flow through OBC 10 from traction battery 12 to DC link capacitor 26 during the pre-charge operation mode is indicated by arrow 44 in FIG. 2.

As described, OBC 10 involves the use of a bidirectional DC/DC stage in plugged-in battery charging applications for both (i) running the pre-charge operation of DC link capacitor 26 by means of traction battery 12 and (ii) charging the traction battery.

In embodiments, OBC 10 may operate to alternate between pre-charging DC link capacitor 26 using electrical power from traction battery 12 and charging the traction battery using electrical power from mains supply 32 until the DC link capacitor is fully pre-charged. This may be useful when the voltage of traction battery 12 is low at system start. In other embodiments, when the voltage of traction battery 12 is low at system start, OBC 10 is configured to use electrical power from the LV DC battery of the electric vehicle (e.g., the 12V vehicle battery) (not shown) to pre-charge DC link capacitor 26.

Variants of DC/DC converter 28 include using full-bridge arrangements instead of half-bridge arrangements shown in FIG. 2. In this case, a capacitor may be in series to the resonant inductor Lr. The power transformer T may be a center-tapped transformer. DC/DC converter 28 may have other resonant tank topologies. DC/DC converter 28 may have a hard-switching topology instead of a soft-switching topology (resonant converters are one type of soft-switched converter topology). In other variants, GND1 and GND2 can be tied together when loss of insulation between the HV-AC side and the HV-DC side is acceptable.

Figure 3:
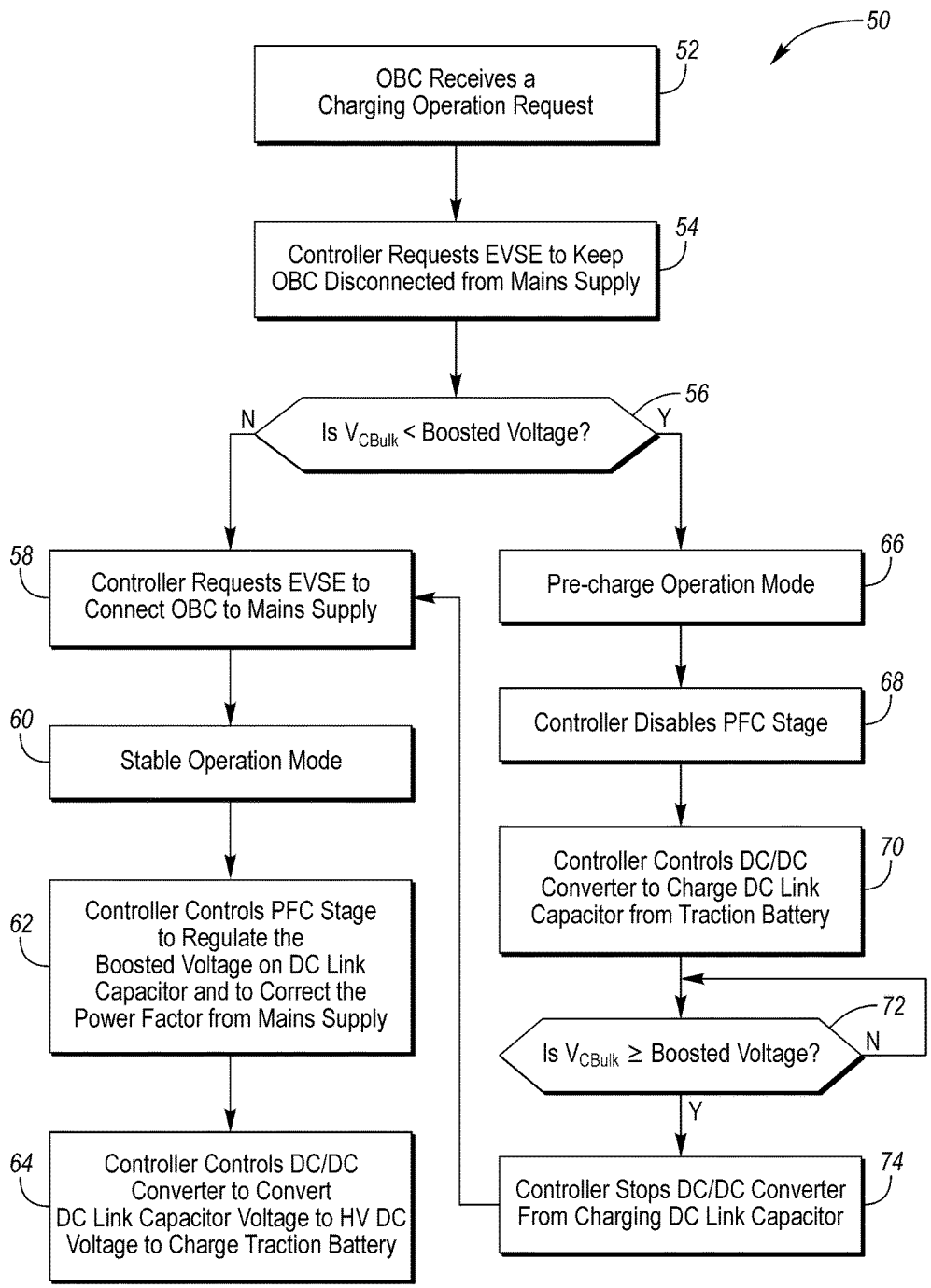
FIG. 3 illustrates a flowchart depicting an exemplary operation of the OBC.

Referring now to FIG. 3, with continual reference to FIGS. 1 and 2, a flowchart 50 depicting an exemplary operation of OBC 10 is shown. The exemplary operation of OBC 10 begins with the OBC receiving a charging operation request, as indicated in block 52. In response to OBC 10 receiving the charging operation request, controller 17 communicates with EVSE 33 to keep OBC 10 disconnected from mains supply 32, as indicated in block 54. Controller 17 then compares the capacitor voltage ("$v_{CBulk}$") of DC link capacitor 26 to a predetermined boosted voltage, as indicated in decision block 56.

When the capacitor voltage of DC link capacitor 26 is greater than the boosted voltage, controller communicates with EVSE 33 to have the EVSE connect OBC 10 to mains supply 32, as indicated in block 58. Controller 17 then controls OBC 10 to operate in the stable operation mode, as indicated in block 60. During the stable operation mode, controller 17 controls PFC stage 14 and DC/DC converter 28 to charge traction battery 12 using AC power from mains supply 32. More particularly, controller 17 controls PFC stage 14 to regulate the boosted voltage on DC link capacitor 26 and to correct the power factor from mains supply 32, as indicated in block 62. Further, controller 17 controls DC/DC converter 28 to convert (i.e., step-up or step-down) the capacitor voltage of DC link capacitor 26 into a HV DC voltage to charge traction battery 12, as indicated in block 64. Hence, electrical power flow during the stable operation mode is from mains supply 32 to traction battery 12.

When the capacitor voltage of DC link capacitor 26 is less than the boosted voltage, controller 17 controls OBC 10 to operate in the pre-charge operation mode, as indicated in block 66. During the pre-charge operation mode, controller 17 disables PFC stage 14, as indicated in block 68, and controls DC/DC converter 28 to charge DC link capacitor 26 using electrical power from traction battery 12, as indicated in block 70. Hence, electrical power flow during the pre-charge operation mode is from traction battery 12 to DC link capacitor 26.

Controller 17 controls OBC 10 to operate in the pre-charge operation mode until the capacitor voltage of DC link capacitor 26 is greater than the boosted voltage, as indicated by decision block 56. Upon the capacitor voltage of DC link capacitor 26 becoming greater than the boosted voltage, controller 17 controls DC/DC converter 28 to stop charging the DC link capacitor, as indicated in block 74. The operation then continues with controller 17 requesting EVSE 33 to connect OBC 10 to mains supply 32, as indicated in block 58, for the stable operation mode to commence, as indicated in block 60.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An on-board charger (OBC) for charging a traction battery of an electric vehicle, comprising:
    a Power Factor Correction (PFC) stage to convert AC power from a mains supply into DC power for use in charging the traction battery;
    a bi-directional DC/DC converter coupled to the traction battery;
    a DC link capacitor that is connected between the PFC stage and the DC/DC converter;
    a controller operable to control the PFC stage and the DC/DC converter to operate in (i) a pre-charge mode in which the DC link capacitor is pre-charged using electrical power from the traction battery and (ii) a stable operation mode in which the traction battery is charged using the AC power from the mains supply; and
    wherein the controller is further operable to control the PFC stage and the DC/DC converter to operate in (i) the pre-charge mode while a value of a voltage of the DC link capacitor is less than a threshold voltage value and (ii) in the stable operation mode while the value of the voltage of the DC link capacitor is greater than the threshold voltage value.

2. The OBC of claim 1 wherein:
    the controller is further operable to disable the PFC stage while the DC link capacitor is being charged using electrical energy from the traction battery.

3. The OBC of claim 1 wherein:
    the controller is further operable to control the PFC stage to correct a power factor of the AC power from the mains supply.

4. The OBC of claim 1 wherein:
    the PFC stage is bi-directional.

5. The OBC of claim 1 wherein:
    the PFC stage is connectable to the mains supply by an Electric Vehicle Supply Equipment (EVSE); and
    the controller is further operable to request the EVSE to not connect the PFC stage to the mains supply during the pre-charge mode.

6. The OBC of claim 1 wherein:
the PFC stage includes a rectifier to convert the AC power from the mains supply into the DC power, wherein the rectifier includes an arrangement of diodes devoid of thyristors.

7. The OBC of claim 1 wherein:
the DC/DC converter is a dual half-bridge resonant DC/DC converter.

8. An on-board charger (OBC) for charging a traction battery of an electric vehicle, comprising:
- a Power Factor Correction (PFC) stage to convert AC power from a mains supply into DC power for use in charging the traction battery;
- a bi-directional DC/DC converter coupled to the traction battery;
- a DC link capacitor that is connected between the PFC stage and the DC/DC converter;
- a controller operable to control the PFC stage and the DC/DC converter to operate in (i) a pre-charge mode in which the DC link capacitor is pre-charged using electrical power from the traction battery and (ii) a stable operation mode in which the traction battery is charged using the AC power from the mains supply;
- an Electric Vehicle Supply Equipment (EVSE) movable between a closed position in which the EVSE connects the PFC stage to the mains supply and an opened position in which the EVSE disconnects the PFC stage from the mains supply; and
- wherein the controller is further operable to request the EVSE to disconnect the PFC stage from the mains supply during the pre-charge mode.

9. The OBC of claim 8 wherein:
the controller is further operable to control the EVSE to connect the PFC stage to the mains supply during the stable operation mode.

10. A method for operating an on-board charger (OBC) configured to charge a traction battery of an electric vehicle, the OBC having a Power Factor Correction (PFC) stage to convert AC power from a mains supply into DC power for use in charging the traction battery, a bi-directional DC/DC converter coupled to the traction battery, and a DC link capacitor that is connected between the PFC stage and the DC/DC converter, the method comprising:
- while a value of a voltage of the DC link capacitor is less than a threshold voltage value, controlling the PFC stage and the DC/DC converter to operate in a pre-charge mode in which the DC link capacitor is pre-charged using electrical power from the traction battery; and
- while the value of the voltage of the DC link capacitor is greater than the threshold voltage value, controlling the PFC stage and the DC/DC converter to operate in a stable operation mode in which the traction battery is charged using the AC power from the mains supply.

11. The method of claim 10 wherein the PFC stage is connectable to the mains supply by an Electric Vehicle Supply Equipment (EVSE), the method further comprising:
requesting the EVSE to not connect the PFC stage to the mains supply during the pre-charge mode.

12. The method of claim 11 further comprising:
controlling the EVSE to connect the PFC stage to the mains supply during the stable operation mode.

\* \* \* \* \*